(12) United States Patent
Chon

(10) Patent No.: US 12,589,725 B2
(45) Date of Patent: Mar. 31, 2026

(54) VEHICLE AND CONTROL METHOD FOR DETERMINING AN EMERGENCY SITUATION

(71) Applicants: Hyundai Motor Company, Seoul (KR); Kia Corporation, Seoul (KR)

(72) Inventor: Un Chon, Seongnam-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 298 days.

(21) Appl. No.: 18/217,086

(22) Filed: Jun. 30, 2023

(65) Prior Publication Data

US 2024/0123966 A1 Apr. 18, 2024

(30) Foreign Application Priority Data

Oct. 12, 2022 (KR) ........................ 10-2022-0130729

(51) Int. Cl.
*B60W 10/08* (2006.01)
*B60W 10/18* (2012.01)
(Continued)

(52) U.S. Cl.
CPC ............ *B60W 10/08* (2013.01); *B60W 10/18* (2013.01); *B60W 30/18127* (2013.01);
(Continued)

(58) Field of Classification Search
None
See application file for complete search history.

(56) References Cited

U.S. PATENT DOCUMENTS 8,818,597 B2 8/2014 Yamane et al.
9,511,775 B2 12/2016 Inomata et al.
(Continued)

FOREIGN PATENT DOCUMENTS

JP 2015-116911 A 6/2015
JP 2021-020567 A 2/2021
(Continued)

OTHER PUBLICATIONS

Espacenet English Translation of KR20190047792A Description (Year: 2019).*

*Primary Examiner* — James J Lee
*Assistant Examiner* — Andrew Sang Kim
(74) *Attorney, Agent, or Firm* — MORGAN, LEWIS & BOCKIUS LLP

(57) ABSTRACT

A vehicle includes an input unit, a first sensor provided to detect an input of a brake signal, a second sensor provided to detect an output of a driving motor, a driving controller provided to control the driving motor, and a main controller electrically connected to the input unit, the first sensor, the second sensor and the driving controller and configured to determine an electric power mode based on the input of the brake signal detected by the first sensor and the output of the driving motor detected by the second sensor when an input related to power off of the vehicle is received through the input unit while the vehicle is driving, wherein the main controller is configured to determine the electric power mode as an emergency mode when it is determined that the driving motor is accelerating while the input of the brake signal is being received.

16 Claims, 9 Drawing Sheets

(51) Int. Cl.
  *B60W 30/18*  (2012.01)
  *B60W 50/14*  (2020.01)

(52) U.S. Cl.
  CPC ....... *B60W 50/14* (2013.01); *B60W 2050/143* (2013.01); *B60W 2050/146* (2013.01); *B60W 2510/244* (2013.01); *B60W 2710/244* (2013.01)

(56)  References Cited

U.S. PATENT DOCUMENTS

| | | | | |
|---|---|---|---|---|
| 2013/0060442 A1* | 3/2013 | Kaster | ..................... | B60T 7/042 |
| | | | | 701/99 |
| 2013/0066507 A1* | 3/2013 | Yamane | .................. | B60R 16/00 |
| | | | | 903/902 |
| 2014/0081561 A1* | 3/2014 | Be | ....................... | B60W 50/085 |
| | | | | 701/112 |
| 2020/0086838 A1* | 3/2020 | Yun | ........................ | B60T 8/444 |
| 2021/0139039 A1* | 5/2021 | Joo | .................... | B60W 40/105 |
| 2021/0162883 A1* | 6/2021 | Shinohara | .............. | B60L 58/22 |

FOREIGN PATENT DOCUMENTS

| | | | | | |
|---|---|---|---|---|---|
| KR | 10-2007-0018373 A | 2/2007 | | | |
| KR | 10-2009-0128244 A | 12/2009 | | | |
| KR | 10-1586738 B1 | 1/2016 | | | |
| KR | 10-1883163 B1 | 7/2018 | | | |
| KR | 2018-0076737 A | 7/2018 | | | |
| KR | 20190047792 A | * | 5/2019 | .............. | B60Q 1/52 |

* cited by examiner

| Brake Pedal | Driving Motor Output | Power-off Input | Emergency Mode or not |
|:---:|:---:|:---:|:---:|
| +++++ | + | × | × |
| + | + | × | × |
| +++++ | − | ○ | × |
| +++++ | + | ○ | ○ |

80

70

VEHICLE AND CONTROL METHOD FOR DETERMINING AN EMERGENCY SITUATION

CROSS-REFERENCE TO RELATED APPLICATION(S)

The present application claims priority to Korean Patent Application No. 10-2022-0130729, filed on Oct. 12, 2022, the entire contents of which is incorporated herein for all purposes by this reference.

BACKGROUND OF THE PRESENT DISCLOSURE

Field of the Present Disclosure

The present disclosure relates to a vehicle capable of controlling the vehicle in an emergency situation and a control method thereof.

Description of Related Art

Vehicles are machines that move on roads by driving wheels, and require power for movement. Such vehicles may be classified into internal combustion engine vehicles and eco-friendly vehicles depending on power sources.

The eco-friendly vehicles include an electric vehicle that includes a battery, which is a chargeable power source, and a driving motor, rotates the driving motor with electricity accumulated in the battery, and drives wheels using rotation of the driving motor, and a hybrid vehicle that includes an engine, a battery and a driving motor, and drives by controlling mechanical power of the engine and electric power of the driving motor.

The eco-friendly vehicle includes a first battery to supply electric power for starting and driving power, further includes various electronic components to protect occupants and provide convenience and fun to the occupants, and a second battery to supply electric power for driving various electronic components (i.e., electronic devices).

Recently, in the case of the present eco-friendly vehicle, controllers to control driving are often controlled based on software, and thus a situation in which control does not proceed smoothly may occur due to a security problem, such as being infected with malicious code.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for reducing the risk of an accident by rebooting a controller that is configured to control a driving motor to escape from an emergency situation or by turning off the controller to prevent acceleration of the vehicle, when the emergency situation occurs while driving and control is not performed smoothly, and a control method thereof.

Additional aspects of the present disclosure will be set forth in part in the description which follows, and in part, will be obvious from the description, or may be learned by practice of the present disclosure.

In accordance with an aspect of the present disclosure, a vehicle includes an input unit, a first sensor provided to detect an input of a brake signal, a second sensor provided to detect an output of a driving motor, a driving controller provided to control the driving motor, and a main controller electrically connected to the input unit, the first sensor, the second sensor and the driving controller and configured to determine an electric power mode based on the input of the brake signal detected by the first sensor and the output of the driving motor detected by the second sensor when an input related to power off of the vehicle is received through the input unit while the vehicle is driving, wherein the main controller is configured to determine the electric power mode as an emergency mode when the main controller concludes that the driving motor is accelerating while the input of the brake signal is being received.

The vehicle may further include a first battery, wherein the main controller is configured to turn off a switch connected to the first battery and reboots the driving controller when the main controller determines the electric power mode as the emergency mode.

The main controller may be configured to determine whether the emergency mode is released based on the input of the brake signal and the output of the driving motor after the driving controller is rebooted.

The main controller may repeat the reboot of the driving controller when the main controller concludes that the emergency mode is not released.

The main controller may turn on the switch connected to the first battery when the main controller concludes that the emergency mode is released.

The vehicle may further include a converter provided to convert electric power charged in the first battery into electric power of a different magnitude, and a second battery connected to the converter to perform charging using electric power transferred from the converter, wherein the main controller may be configured to determine a state of charging (SOC) of the second battery and charge the second battery through the converter in response that the SOC value of the second battery is less than a predetermined charging amount.

The main controller may be configured to generate a control signal for providing a notification to perform emergency power input when the main controller determines the electric power mode as the emergency mode.

The vehicle may further include a display, and a speaker, wherein the main controller may provide the notification visually through the display or provide the notification aurally through the speaker.

The main controller may turn off the driving controller when the emergency power is input.

The main controller may be configured to generate a control signal for providing a turn-off notification of the driving controller.

In accordance with an aspect of the present disclosure, a control method of a vehicle includes detecting an input of a brake signal, detecting an output of a driving motor, and determining an electric power mode based on the detected input of the brake signal and the detected output of the driving motor when an input related to power off of the vehicle is received through the input unit while the vehicle is driving, wherein the determining of the electric power mode includes determining the electric power mode as an emergency mode when the main controller concludes that the driving motor is accelerating while the input of the brake signal is being received.

The control method may further include turning off a switch connected to a first battery and rebooting a driving controller configured for controlling the driving motor when the main controller determines the electric power mode as the emergency mode.

The control method may further include determining whether the emergency mode is released based on the input of the brake signal and the output of the driving motor after the driving controller is rebooted.

The control method may further include repeating the reboot of the driving controller when the main controller concludes that the emergency mode is not released.

The control method may further include turning on a switch connected to the first battery when the main controller concludes that the emergency mode is released.

The control method may further include determining a state of charging (SOC) of a second battery, and charging the second battery using electric power transferred from a converter converting electric power charged in the first battery into electric power of a different magnitude in response that the SOC value of the second battery is less than a predetermined charging amount.

The control method may further include generating a control signal for providing a notification to perform emergency power input when the main controller determines the electric power mode as the emergency mode.

The providing of the notification may include providing the notification visually through a display or providing the notification aurally through a speaker.

The control method may further include turning off the driving controller when the emergency power is input.

The control method may further include generating a control signal for providing a turn-off notification of the driving controller.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
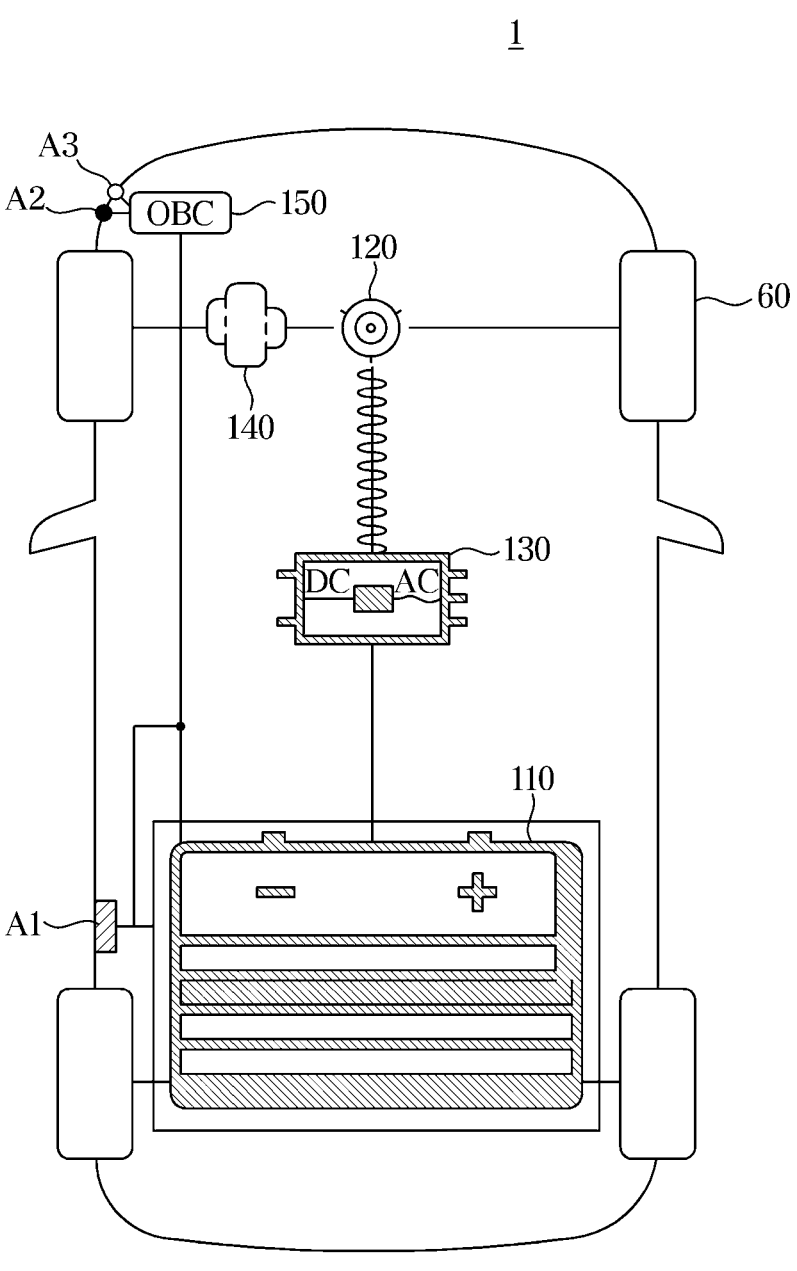
FIG. 1 is an exemplary view of a power unit of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. The present specification does not describe all factors of embodiments, and duplicative contents between general contents or embodiments in the field of the present disclosure will be omitted. The terms 'unit.' 'member,' 'module,' and 'device' used in the present specification may be embodied as software or hardware, and it is also possible for a plurality of 'units,' 'members,' 'modules.' and 'devices' to be embodied as one component, or one 'unit.' 'member,' 'module,' and 'device' to include a plurality of components according to the embodiments.

The exemplary embodiments described herein and the configurations shown in the drawings are only examples of embodiments of the present disclosure, and various modifications may be made at the time of filing of the present disclosure to replace the exemplary embodiments and drawings of the present specification.

The terms used herein are for describing the exemplary embodiments and are not intended to restrict and/or to limit the present disclosure. For example, the singular expressions herein may include plural expressions, unless the context clearly dictates otherwise. Also, the terms "includes" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

Furthermore, terms such as "~unit", "~part," "~block," "~member," "~module," and the like may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

The ordinal numbers such as "first ~" and "second ~" used in front of components described in the present specification are only used to distinguish the components from each other, and do not have other meanings such as connection order, use order, and priority between these components.

Identification numerals provided to steps are used to identify the steps, the identification numerals do not indicate the order of the steps, and each step may be performed differently from the order specified unless the context clearly states an order.

The disclosed exemplary embodiments of the present disclosure may be implemented in a form of a recording medium storing instructions executable by a computer. The instructions may be stored in a form of program code, and when executed by a processor, a program module may be generated to perform the operations of the disclosed exemplary embodiments of the present disclosure. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

Hereinafter, an exemplary embodiment of a vehicle and a control method thereof according to an aspect will be described in detail with reference to the accompanying drawings.

FIG. 1 is an exemplary view of a power unit of a vehicle according to an exemplary embodiment of the present disclosure.

A vehicle according to the exemplary embodiment of the present disclosure may be an eco-friendly vehicle driven by electricity to reduce fuel consumption and emission of harmful gases.

The eco-friendly vehicles include an electric vehicle that includes a battery, which is a chargeable power source, and a motor, rotates the motor with electricity accumulated in the battery, and drives wheels using rotation of the motor, a hybrid vehicle that includes an engine, a battery and a motor, and drives by controlling mechanical power of the engine and electric power of the motor, and a hydrogen fuel cell vehicle.

In the exemplary embodiment of the present disclosure, an electric vehicle will be described as an example.

A vehicle includes an accelerator pedal provided to be pressed by a user depending on an acceleration intention of the user, a brake pedal provided to be pressed by the user depending on a braking intention of the user, and a steering wheel of a steering device provided to adjust a driving direction.

Wheels 60 disposed on front, rear, left and right sides, respectively, a power unit provided to apply a driving force to the front, rear, left and right wheels 60, the steering device, a braking device provided to apply a braking force to the front, rear, left and right wheels 60, and a suspension device may be provided in a chassis.

The power unit is a device that generates a driving force required for driving of the vehicle and adjusts the generated driving force.

As illustrated in FIG. 1, a power unit of a vehicle 1 includes a first battery 110, a driving motor 120, an inverter 130, a speed reducer 140, and a charge controller 150.

The first battery 110 may include a plurality of battery cells to generate a high-voltage current to provide a driving force to the vehicle 1.

The first battery 110 may include a plurality of battery modules. Each of the battery modules may include a plurality of battery cells connected in series and parallel.

Battery cells may be gathered to form a battery module, and battery modules may be gathered to form a battery pack.

The driving motor 120 generates a rotation force using electrical energy of the first battery 110 and transmits the generated rotation force to the wheels 60 so that the wheels 60 are driven.

The driving motor 120 converts the electrical energy of the first battery 110 into mechanical energy for operating various devices provided in the vehicle 1.

When the driving motor 120 is started on, maximum current is supplied to generate maximum torque.

The driving motor 120 may operate as a generator under energy regeneration conditions such as braking, deceleration, steel plate driving, and low-speed driving so that the first battery 110 is charged.

The inverter 130 drives the driving motor 120 in response to a control command from a processor. The inverter 130 may convert electric power of the first battery 110 into driving electric power of the driving motor 120.

When the driving electric power of the driving motor 120 is output, the inverter 130 outputs the driving electric power of the driving motor 120 based on a target driving speed according to a user command. The driving electric power of the driving motor 120 may vary depending on a switching signal for outputting a current corresponding to the target driving speed and a switching signal for outputting a voltage corresponding to the target driving speed.

The inverter 130 may also transfer electric power generated by the driving motor 120 to the first battery 110 during regenerative braking. That is, the inverter 130 may include a plurality of switch elements and perform a function of changing a direction and output of current between the driving motor 120 and the first battery 110.

The speed reducer 140 transmits a rotation force obtained by reducing a speed of the driving motor 120 and increasing torque of the driving motor 120 to the wheels 60.

The vehicle 1 may further include a charge controller 150 provided on an exterior of a vehicle body, connected to a fast charging cable or slow charging cable, and receiving electric power for charging the first battery 110.

The charge controller 150 may include a fast charger A1 for fast charging the first battery 110, and a slow charger A2 for charging the first battery 110 at a slower rate than the fast charging rate.

The fast charging cable for fast charging may be connected to the fast charger A1, and the slow charging cable for slow charging may be connected to the slow charger A2.

The fast charger A1 for fast charging and the slow charger A2 for slow charging, which is slower than fast charging, may be provided at the same location or at different locations on the exterior of the vehicle 1.

The fast charger A1 and the slow charger A2 may be electrical outlets to which the fast charging cable and the slow charging cable for charging are connected.

The fast charger A1 may directly connect the first battery 110 of the vehicle 1 to an external electric power source connected to the fast charging cable. The external electric power source may supply electric power of about 220V to the vehicle 1 as electric power of a charging station or electric power network.

A transducer including a converter, an inverter, a high-frequency isolation transformer, a rectifier, and the like may be provided in the fast charging cable. The transducer in the fast charging cable may convert commercial AC power into electric power for fast charging a battery of a vehicle.

The electric power source may include a fast electric power source and a slow electric power source.

The fast electric power source may supply electric power of about 800V to the vehicle through the fast charging cable. In the instant case, the fast charging cable may be used as a means of supplying electric power of 800V.

The slow electric power source may supply electric power of 220V to the vehicle.

The slow charger A2 may be an electrical outlet into which a 5-pin connector is inserted and connected, or an electrical outlet into which a 7-pin connector is inserted and connected.

When the cable is a 5-pin connector, a live pin (L1), a neutral pin (L2/N), a ground pin (GND), a proximity detection pin (PD), and a control pilot pin (CP) which is a control check pin may be included.

When the cable is provided with 7 pins, L2 and L3 pins may be further included as a 3-phase AC connector.

The charge controller 150 (OBC: on-board charger) converts an external commercial power (AC) supplied from the slow charger A2 into rectified and direct current and transfers the converted current to the first battery 110. The charge controller 150 may include an AC rectifier, a power factor correction (PFC), a converter, and a capacitor.

The charge controller 150 (OBC: on-board charger) may further include a power transmitter A3 to which a power transmission cable is connected.

The vehicle 1 may include not only the mechanical components described above, but also various electronic components for control of the vehicle 1 and safety and convenience of occupants.

For example, the electronic components may include an audio video navigation device (AVN device) or a vehicle terminal, an air conditioner (heating/ventilation/air conditioning; HVAC) for controlling inflow of air from the outside of the vehicle 1 or heating or cooling the indoor air depending an indoor temperature of the vehicle 1, door locks, wipers, power seats, heating wires of the seats, ventilators of the seats, internal lamps and a power tailgate.

The various electronic components may be loads that perform predetermined functions while receiving electric power and consuming the received electric power.

The electronic components may communicate with each other through a vehicle communication network NT. For example, the electronic components may transmit and receive data using a communication network such as an Ethernet, a Media Oriented Systems Transport (MOST), Flexray, a Controller Area Network (CAN), a Local Interconnect Network (LIN).

Figure 2:
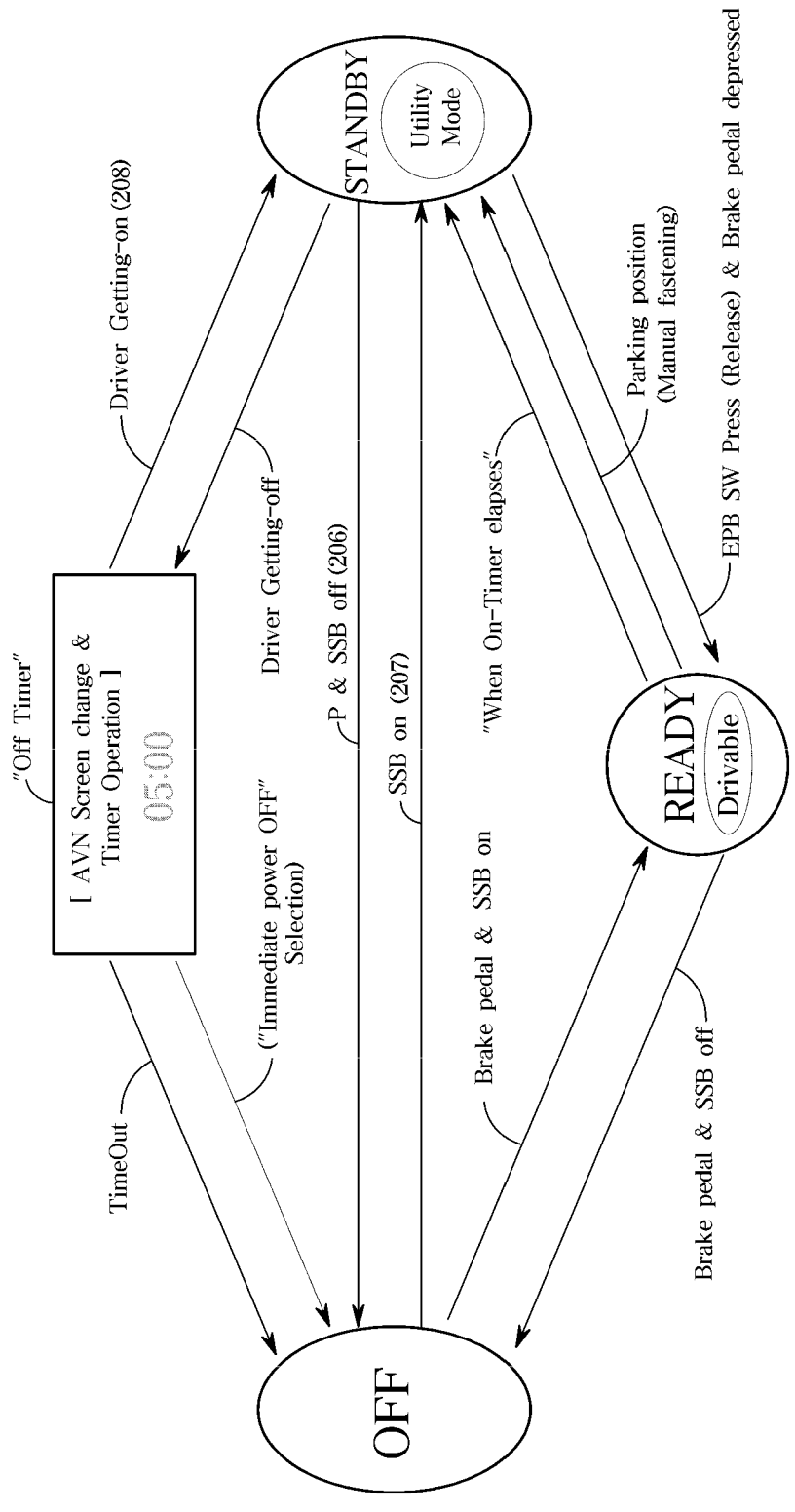
FIG. 2 is a diagram illustrating conversion of an electric power mode of a power management device of the vehicle according to an exemplary embodiment of the present disclosure.

FIG. 2 is a diagram illustrating conversion of an electric power mode of a power management device of the vehicle according to an exemplary embodiment of the present disclosure.

The controller may be configured for controlling mode conversion between an off mode and a ready mode, between the ready mode and a standby mode, or between the off mode and the standby mode, in response to a start-on signal and a start-off signal, a pedal signal of the brake pedal, a turn-on signal of a parking button, an off signal of the parking button, a lever signal of a shift lever, detection information of a detector, and a user input received by the vehicle terminal, and may change display information of the vehicle terminal.

Hereinafter, the mode conversion between the off mode (OFF) and the ready mode (READY) will be described.

The main controller 10 converts the off mode into the ready mode when the start-on signal is received and the pedal signal is received from a pedal signal receiver while the off mode is being performed. The pedal signal may include a pedal effort signal of the brake pedal.

The main controller 10 converts the ready mode into the off mode when the start-off signal is received and the pedal signal is received from the pedal signal receiver while the ready mode is being performed.

In a case of a stopped state while the ready mode is being performed, when only the start-off signal is received without a signal from the brake pedal, the main controller 10 automatically shifts the shift lever to a P position in the ready mode and then converts to the off mode.

The stopped state may include an auto hold keeping state in a D position or R position of the shift lever, and a stopped state after manually shifting the shift lever to a N position on a flatland.

Hereinafter, mode conversion between the ready mode and the standby mode will be described.

The main controller 10 needs to determine whether an intention of the user to drive does not exist to determine whether to convert from the ready mode to the standby mode.

The main controller 10 is configured to determine whether the lever signal received is a parking (P) position signal when the lever signal is received from the lever signal receiver while the ready mode is being performed, and is configured to determine that the intention of the user to drive does not exist and immediately converts the ready mode into the standby mode when the received lever signal of the shift lever is the parking (P) position signal.

The main controller 10 may also convert the ready mode into the standby mode when the turn-on signal is received from the parking button while the ready mode is being performed.

The main controller 10 needs to determine whether the intention of the user to drive does not exist even in a state in which the shift lever is not in the parking position.

The main controller 10 may be configured for controlling an operation of a standby mode-on timer to determine that the intention of the user to drive does not exist in a state in which the shift lever is not in the parking position after converting to the ready mode.

The main controller 10 counts the time of an on-timer from the time the vehicle stops while the ready mode is being performed, and in a case of determining that the intention of the user to drive does not exist within a reference time, converts the ready mode into the standby mode when the reference time elapses. The reference time may be, for example, about 10 minutes.

The main controller 10 may be configured to determine that the intention of the user to drive does not exist when operation signals of the shift lever, the brake pedal, and the steering wheel are not received.

The main controller 10 is configured to determine whether a driving speed of the vehicle is less than a preset driving speed based on speed information of a speed detector, is configured to determine whether the shift lever is in the parking position based on the lever signal of the lever signal receiver when it is determined that the driving speed of the vehicle is less than the preset driving speed, and is configured to determine that the vehicle is in the stopped state when it is determined that the shift lever is not in the parking position. The preset driving speed may be about 5 km/h or less.

The main controller 10 counts the time from a point in time when it is determined that the vehicle is in the stopped state, and in the case of determining that the intention of the user to drive does not exist within the reference time of the on-timer, automatically changes the shift lever to the parking position and converts to the standby mode, when the reference time elapses.

The main controller 10 may be configured for controlling the position of the shift lever so that the shift lever is changed to the parking position when the ready mode is converted to the standby mode.

The main controller 10 may be configured for controlling to keep the operation of the on-timer even when an opening/closing signal of a door and a user input for first, second, and third loads are received.

The processor is configured to determine that the intention of the user to drive does not exist when it is determined that the driving speed of the vehicle is less than the preset driving speed and the shift lever is in the reverse position.

The main controller 10 converts the standby mode into the ready mode when the off signal is received from the parking button and the pedal signal is received from the pedal signal receiver while the standby mode is being performed.

The off signal of the parking button may be a release signal of an electronic parking brake device.

Hereinafter, mode switching between off mode and standby mode will be described.

When the lever signal is received from the lever signal receiver while the standby mode is being performed, the main controller 10 determines whether the received lever signal is the parking position signal, determines whether the start-off signal is received when it is determined that the received lever signal is the parking position signal, and converts the standby mode into the off mode when it is determined that the start-off signal is received.

The main controller 10 converts the off mode into the standby mode when it is determined that the start-on signal is received while the off mode is being performed.

The main controller 10 may change display information of the vehicle terminal during mode conversion between the standby mode and the off mode.

The main controller 10 may be configured for controlling the vehicle terminal to display progress information of the standby mode when it is determined that the user is in the vehicle while the standby mode is being performed, and may be configured for controlling to keep the standby mode.

The main controller 10 may change the navigation image to an image of the progress information of the standby mode and display the image when it is determined that the user got out of the vehicle while the standby mode is being performed, and may display a plurality of buttons to change setting information of the standby mode. Through this, when the user gets off the vehicle, the passenger may change the setting information of the standby mode.

The main controller 10 may change the image of the progress information of the standby mode to image of an off-timer and display the image when it is determined that the user got out of the vehicle while the standby mode is being performed, and may be configured for controlling the vehicle terminal to display remaining time information counted by the off-timer.

The off-timer counts a time remaining to a time of point of conversion to the off mode.

Power saving may be realized by changing cover information displayed on the vehicle terminal.

The main controller 10 may convert a power saving mode of the vehicle terminal to a normal mode in response to a door open signal, a door close signal, and a user input of the vehicle terminal.

The main controller 10 displays the image of the off-timer when converted to the standby mode, and counts the time from the start of the standby mode while the standby mode is being performed, and converts the standby mode into the off mode when it is determined that the counted time has passed a preset time.

The main controller 10 converts the standby mode into the off mode when a selection signal of a power-off button b3 is received immediately while the standby mode is being performed.

The main controller 10 may change a power extension time in response to a selection signal of a power extension time button b1 while the standby mode is being performed, and may display information related to a charged state of the first battery.

The main controller 10 may stop the operation of the off-timer when it is determined that the user gets on the vehicle again after getting off the vehicle while the standby mode is being performed.

The electric power mode of the vehicle has been described above. Hereinafter, control of the vehicle when an emergency situation occurs while the vehicle including the electric power mode is driving will be described.

Figures 3, 4:
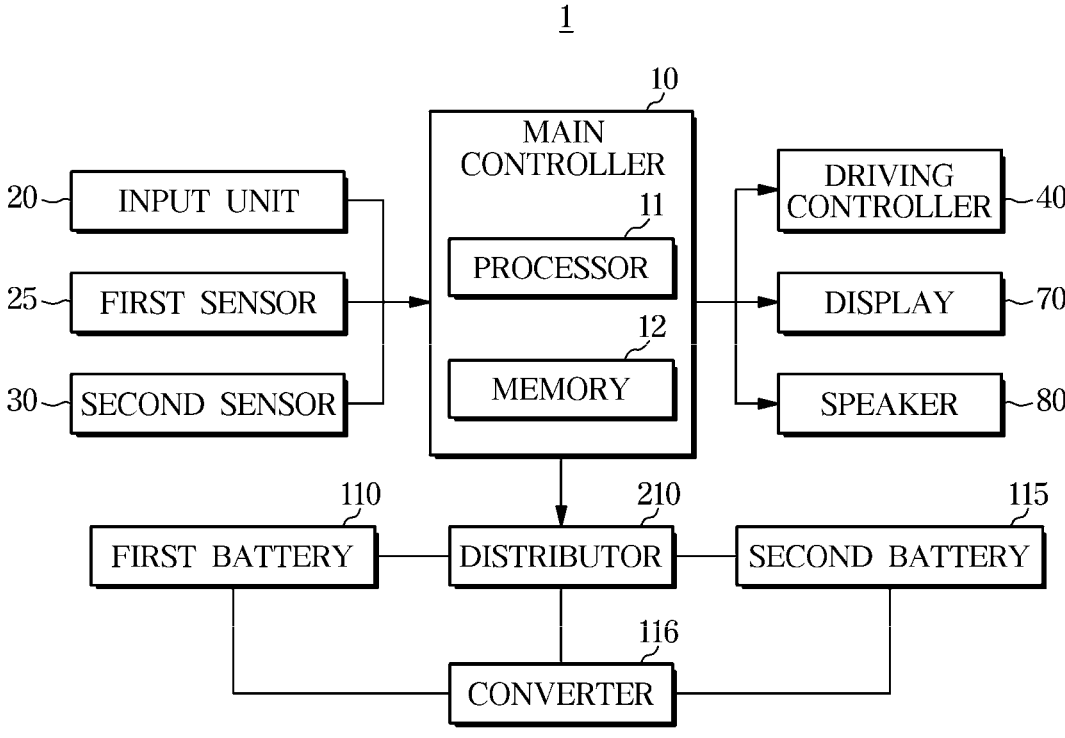
FIG. 3 is a control block diagram of the vehicle according to an exemplary embodiment of the present disclosure.
FIG. 4 is a diagram illustrating determination of an emergency mode depending on cases according to an exemplary embodiment of the present disclosure.

FIG. 3 is a control block diagram of the vehicle according to an exemplary embodiment of the present disclosure.

The vehicle 1 may include an input unit 20, a first sensor 25, a second sensor 30, the main controller 10, a driving controller 40, a display 70, and a speaker 80. The main controller 10 may include a processor 11 and a memory 12.

As described above, the vehicle 1 may also include the first battery 110, a second battery 115 and a converter 116.

The input unit 20 may receive an input related to power ON/OFF of the vehicle 1 from the user such as a driver of the vehicle 1.

Normally, a vehicle utilizes a start button or the like, but in the case of the electric vehicle 1, power ON/OFF of the vehicle 1 may be controlled in a form of a separate power button or the like. Accordingly, the input unit 20 may be implemented in a button form, but the form is not limited.

The first sensor 25 may detect an input of a brake, the second sensor 30 may detect an output of the driving motor 120, and the driving controller 40 may be configured for controlling the driving motor 120.

The main controller 10 may include the memory 12 to store control programs and control data for determining the electric power mode of the vehicle 1 and controlling batteries and various controllers, and the at least one processor 11 to generate control signals depending on the control programs and control data stored in the memory 12. The memory 12 and the processor 11 may be provided integrally or separately.

The memory 12 may store programs and data for determining the electric power mode of the vehicle 1 and controlling batteries and various controllers.

The memory 12 may include a volatile memory for temporarily storing data such as a static random access memory (S-RAM) and a dynamic random access memory (D-ROM). Also, the memory 12 may include a non-volatile memory such as a read only memory (ROM), an erasable programmable read only memory (EPROM), and an electrically erasable programmable read only memory (EEPROM).

The at least one processor 11 may include various logic circuits and arithmetic circuits, process data according to a program provided from the memory 12, and generate a control signal according to a processing result.

When an input related to power off of the vehicle 1 is received through the input unit 20 while the vehicle 1 is driving, the main controller 10 may be configured to determine the electric power mode based on the detection results of the first sensor 25 and the second sensor 30.

The main controller 10 may be configured to determine the electric power mode based on an input of a brake signal detected by the first sensor 25 and the output of the driving motor 120 detected by the second sensor 30.

A detailed description of the electric power mode determination will be described with reference to FIG. 4.

The main controller 10 may be configured for controlling the driving controller 40, the display 70, the speaker 80, and the battery based on the determination result as described above.

FIG. 4 is a diagram illustrating determination of an emergency mode depending on cases according to an exemplary embodiment of the present disclosure.

As described above, the main controller 10 may be configured to determine whether the vehicle 1 is in an emergency mode when an input related to power off of the vehicle 1 is received through the input unit 20 while the vehicle 1 is driving.

Therefore, when an input related to power off is not received, the main controller 10 may not determine whether the vehicle 1 is in the emergency mode, and accordingly, may not determine the electric power mode as the emergency mode.

When an input related to power off of the vehicle 1 is received through the input unit 20 while the vehicle 1 is driving, and when it is determined that there is no output of the driving motor 120 in a situation in which the brake signal is strongly input, that is, when the driving motor 120 is not accelerated, the main controller 10 may be configured to determine that the electric power mode is not the emergency mode.

When the input related to power off of the vehicle 1 is received through the input unit 20 while the vehicle 1 is driving, and when it is determined that there is the output of the driving motor 120 in the situation in which the brake signal is strongly input, that is, when the driving motor 120 is accelerated, the main controller 10 may be configured to determine that the electric power mode is the emergency mode.

A control process of the main controller when it is determined that the electric power mode is the emergency mode as described above, will be described in detail below. To the present end, an electric power system of the vehicle will be described first.

Figure 5:
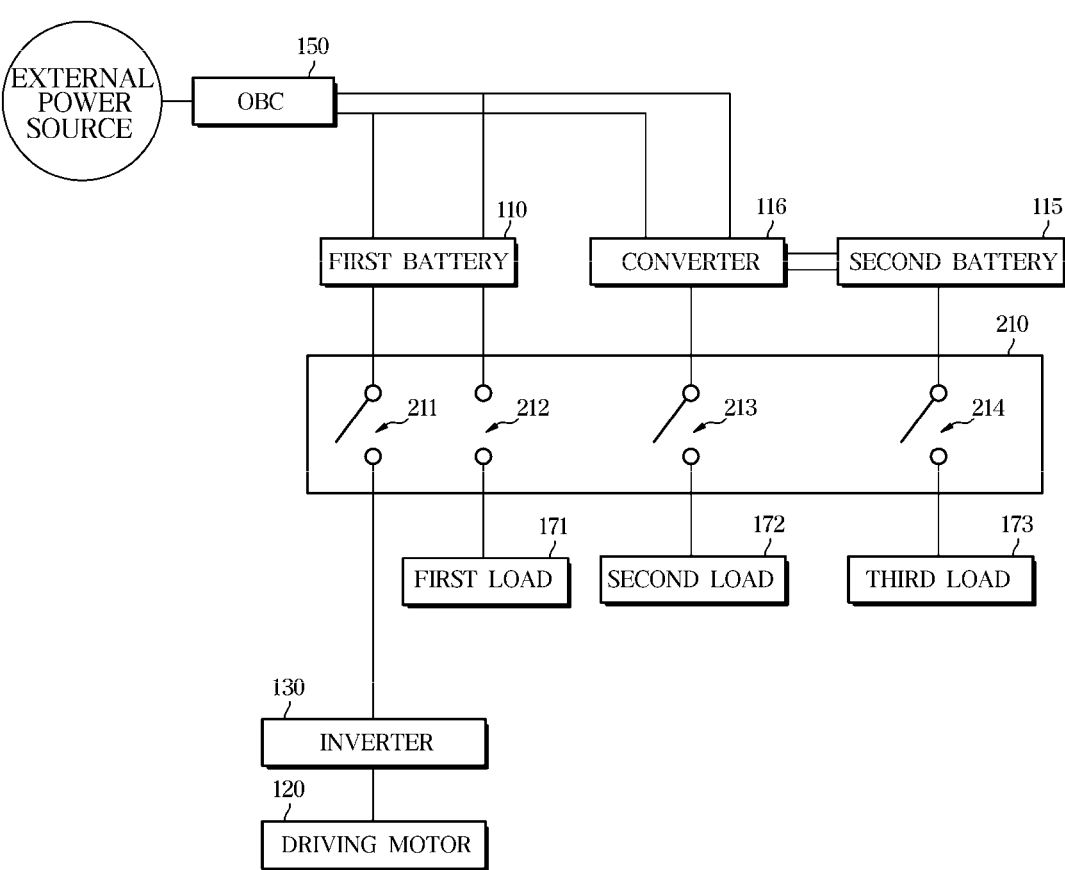
FIG. 5 is a schematic diagram of an electric power system managed by the power management device of the vehicle according to an exemplary embodiment of the present disclosure.

FIG. 5 is a schematic diagram of an electric power system managed by the power management device of the vehicle according to an exemplary embodiment of the present disclosure.

A distributor 210 may include a plurality of switches 211, 212, 213, and 214.

The plurality of switches may be turned on or off in response to a control command of the processor. Each of the switches 211, 212, 213, and 214 may be a relay.

As illustrated in FIG. 5, the plurality of switches may include the first and second switches 211 and 212 to supply electric power of the first battery 110, and may include the third switch 213 to supply electric power of the converter 116 and the fourth switch 214 to supply electric power of the second battery 115.

The first switch 211 is connected between the first battery 110 and the driving motor 120, supplies electric power of the first battery to the drive motor in response to a turn-on operation, and cuts off the electric power of the first battery to be supplied to the drive motor 120 in response to a turn-off operation.

The second switch 212 is connected between the first battery 110 and a first load 171, supplies the electric power of the first battery 110 to the first load 171 consuming high electric power in response to the turn-on operation, and cuts off the electric power of the first battery 110 to be supplied to the first load 171 in response to the turn-off operation.

The first load 171 may include an air conditioning device, or a heater and a hot wire.

The third switch 213 is connected between the converter 116 and a second load 172, supplies the converted electric power of the first battery 110 to the second load 172 consuming low electric power in response to the turn-on operation, and cuts off the converted electric power of the first battery 110 to be supplied to the second load 172 in response to the turn-off operation.

The second load 172 may be a load that consumes less electric power than the electric power consumed by the first load 171. For example, the second load 172 may include a vehicle terminal, a lamp, and the like.

The fourth switch 214 is connected between the second battery 115 and a third load 173, supplies electric power of the second battery 115 to the third load 173 consuming low electric power in response to the turn-on operation, and cuts off the electric power of the second battery to be supplied to the third load 173 in response to the turn-off operation.

The third load 173 may include a communication unit.

As illustrated in FIG. 5, the vehicle may further include a second converter for boosting DC electric power of the first battery 110 to increase output and efficiency of the driving motor 120.

The first switch 211 may be provided between the first battery 110 and the second converter.

That is, the second converter is configured to convert the DC electric power charged in the first battery 110 into DC electric power of a predetermined magnitude or greater.

For example, the second converter may convert a DC voltage of about 72V output from the first battery 110 into a DC voltage of 300V. The second converter may be omitted depending on the output of the first battery, the driving electric power of the driving motor, and the capacity of the inverter.

The second converter may include at least one switch element and an inductor.

The inverter 130 converts the DC voltage into an AC voltage in response to an output voltage received from the second converter and applies the converted AC voltage to the driving motor 120.

The inverter 130 transfers regenerative energy of the driving motor 120 to the first battery 110 while the vehicle is braking so that the first battery 110 may be charged.

The main controller 10 may be configured for controlling turn-off operations of the first, second, third, and fourth switches when the electric power mode is the off mode.

The main controller 10 is configured to control the turn-off operation of the first switch mode and is configured to control the turn-on operations of the second, third, and fourth switches, when the electric power mode is the standby, and is configured to control the turn-on operations of the first, second, third and fourth switches when the electric power mode is the ready mode.

When the electric power mode is the standby mode, the main controller 10 may be configured for controlling the operation of the driving motor 120 to be stopped and control the remaining electronic components to be operated. The remaining electronic components may include the first, second, and third loads.

When the electric power mode is the ready mode, the main controller 10 may be configured for controlling the driving motor 120 and all electronic components to be operated by supplying electric power to the drive motor 120 and all the electronic components.

The main controller 10 may independently control the supply of electric power to a driving system and a non-driving system. The driving system includes the driving motor 120, and the non-driving system includes the electronic components other than the driving motor.

Hereinafter, a case in which the main controller 10 is configured to determine that the electric power mode is the emergency mode will be described.

Figure 6:
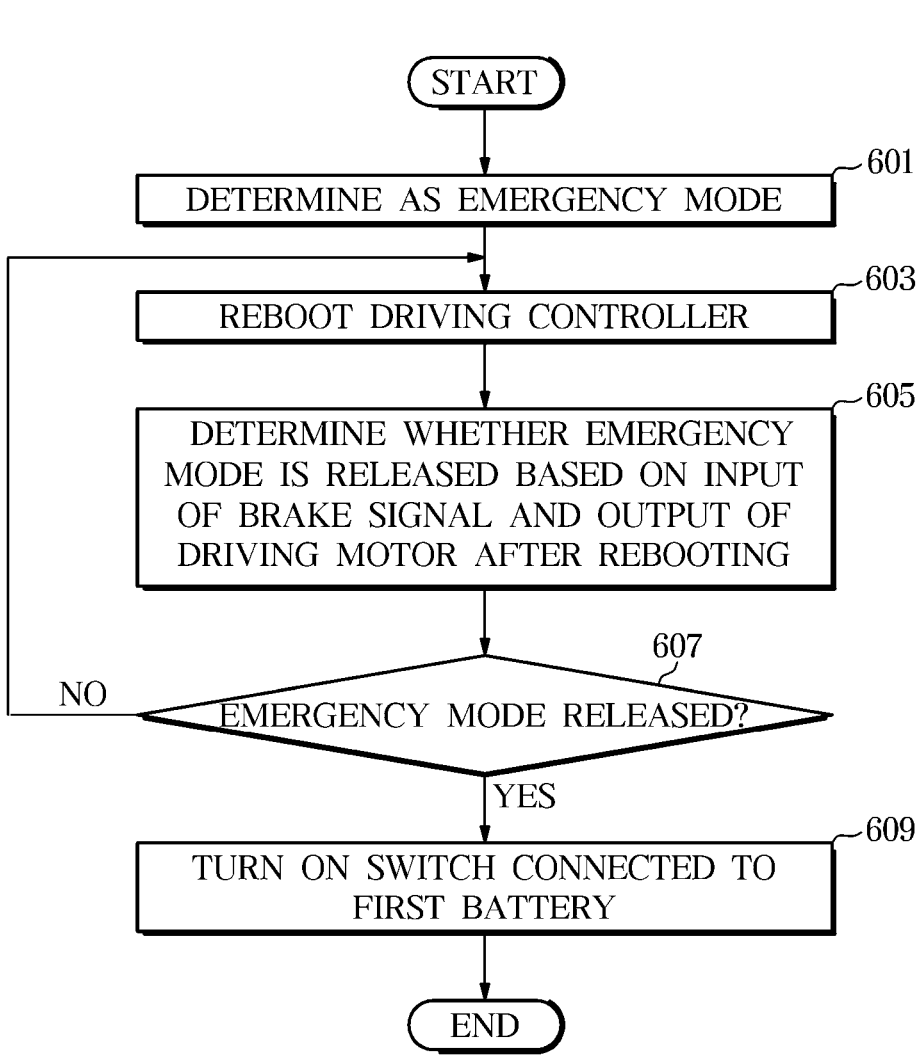
FIG. 6 is a control flowchart of the vehicle in the emergency mode according to an exemplary embodiment of the present disclosure.

FIG. 6 is a control flowchart of the vehicle in the emergency mode according to an exemplary embodiment of the present disclosure.

As described above, recently, controllers to control driving of a vehicle are often controlled based on software, and thus a situation in which control does not proceed smoothly may occur due to a security problem, such as being infected with malicious code.

In the instant case, because communication between the respective controllers may not be smooth, there may be a case in which the controllers has to be forcibly turned off because communication between the controllers is not smooth, but conversely, there is a case in which the communication is performed between the controllers, and these cases will be separately described.

First, a case in which communication between the controllers is performed even though an emergency situation occurs while driving will be described.

When the main controller 10 determines that the electric power mode of the vehicle 1 is the emergency mode according to the above-described determination process (601), the main controller 10 may turn off the switch 211 connected to the first battery 110 and reboot the driving controller 40 (603).

Because the first battery 110, which is a high-voltage battery, includes a risk of accident in an emergency situation, the main controller 10 may turn off the first battery 110 and operate various controller using the second battery 115 including low electric power.

The main controller 10 may be configured to determine whether the emergency mode is released based on the input of the brake signal and the output of the driving motor 120 after the driving controller 40 is rebooted (605).

Because the emergency situation described above may be resolved by rebooting the driving controller 40, the main controller 10 may first reboot the driving controller 40 that is configured to control the driving motor 120.

When it is determined that the emergency mode is not released (NO in 607), the main controller 10 may repeat the reboot of the driving controller 40. In the instant case, there is no limit on the number of times of reboots, and the reboots may be performed at an appropriate number of times until the driving controller 40 may operate smoothly.

When it is determined that the emergency mode is not released even after that, the main controller 10 may turn off the driving controller 40 through a separate emergency power input, which will be described later.

When it is determined that the emergency mode is released according to the reboot of the driving controller 40 (YES in 607), the main controller 10 may turn on the switch 211 connected to the first battery 110 (609).

When the first battery 110 is turned on, the main controller 10 may be configured to determine the SOC value of the second battery 115, that is, the state of charge.

Because in the emergency mode, the first battery 110 is turned off and the driving controller 40 is operated using the second battery 115, to prevent the second battery 115 from being discharged, the SOC value of the second battery 115 may be determined.

The main controller 10 may charge the second battery 115 through the converter 116 when the SOC value of the second battery 115 is less than a predetermined charging amount.

Hereinafter, the case in which the controller has to be forcibly turned off the controllers because communication between the controllers is not smooth in an emergency situation will be described with reference to FIGS. 7 and 8.

Figure 7:
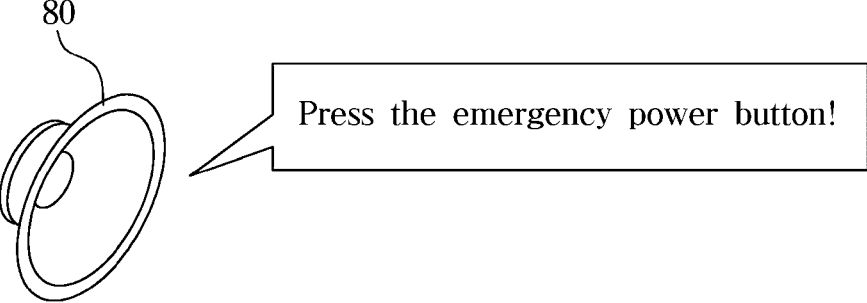
FIG. 7 is a diagram illustrating providing of a notification according to an exemplary embodiment of the present disclosure.
Figure 7:
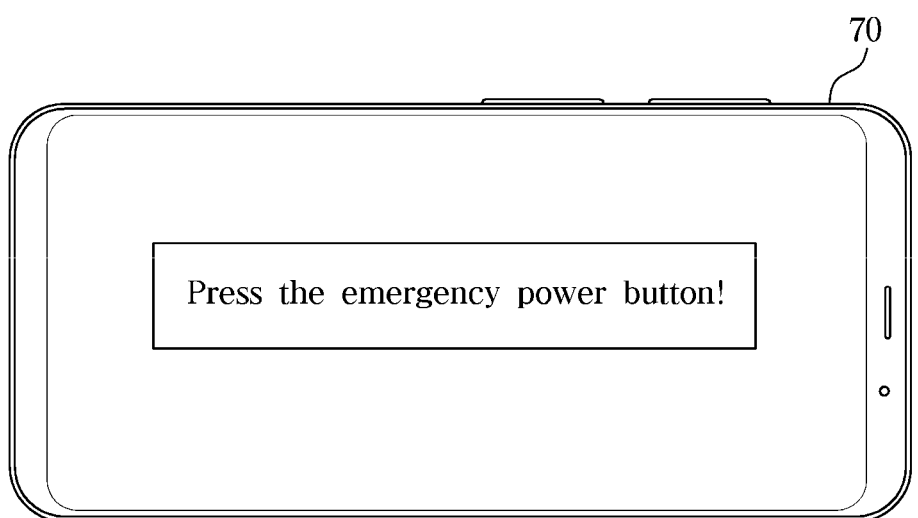
Figure 8:
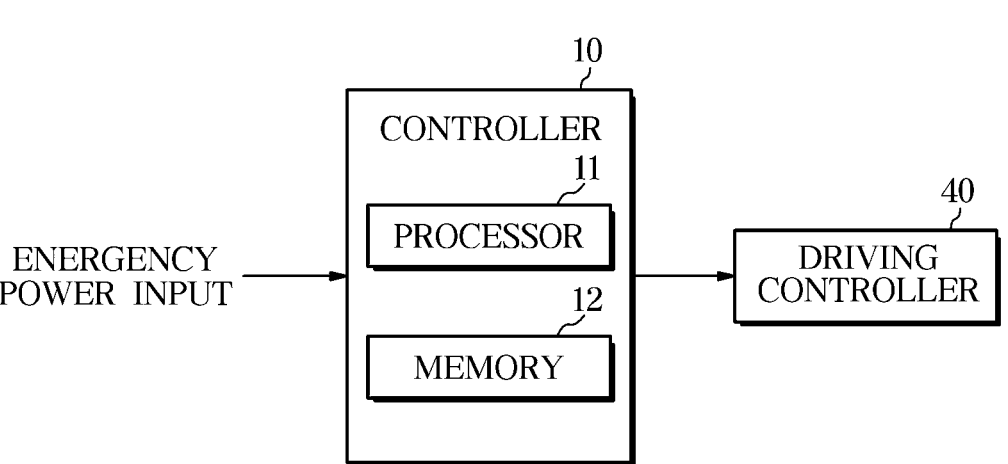
FIG. 8 is a control block diagram of the vehicle according to an exemplary embodiment of the present disclosure.

FIG. 7 is a diagram illustrating providing of a notification according to an exemplary embodiment of the present disclosure, and FIG. 8 is a control block diagram of the vehicle according to an exemplary embodiment of the present disclosure.

As described above, when it is determined that an input related to power off of the vehicle 1 is received through the input unit 20 while the vehicle 1 is driving and the driving motor 120 is accelerating while the input of the brake signal is being received, the main controller 10 may be configured to determine the electric power mode of the vehicle 1 as the emergency mode.

In the instant case, when communication between the controllers is not smooth, the controllers may have to be forcibly turned off.

Accordingly, the main controller 10 may be configured to generate a control signal for providing a notification to perform the emergency power input.

This notification may be provided visually through the display 70 or aurally through the speaker 80.

In a case in which the present notification may not be performed because communication between the controllers is not smooth, when the emergency power input is received from the user or the like even without a separate notification, the following control may be performed.

The main controller 10 may turn off the driving controller 40 when emergency power is input from the user or the like.

That is, by turning off the driving controller 40 that is configured to control the driving motor 120 driving the vehicle 1, a situation in which the vehicle 1 accelerates against an intention of the user due to a malicious code infection or the like may be prevented.

The main controller 10 may be configured to generate a control signal for providing a turn-off notification of the driving controller 40 to notify a user or the like of the turn-off of the driving controller 40.

Figure 9:
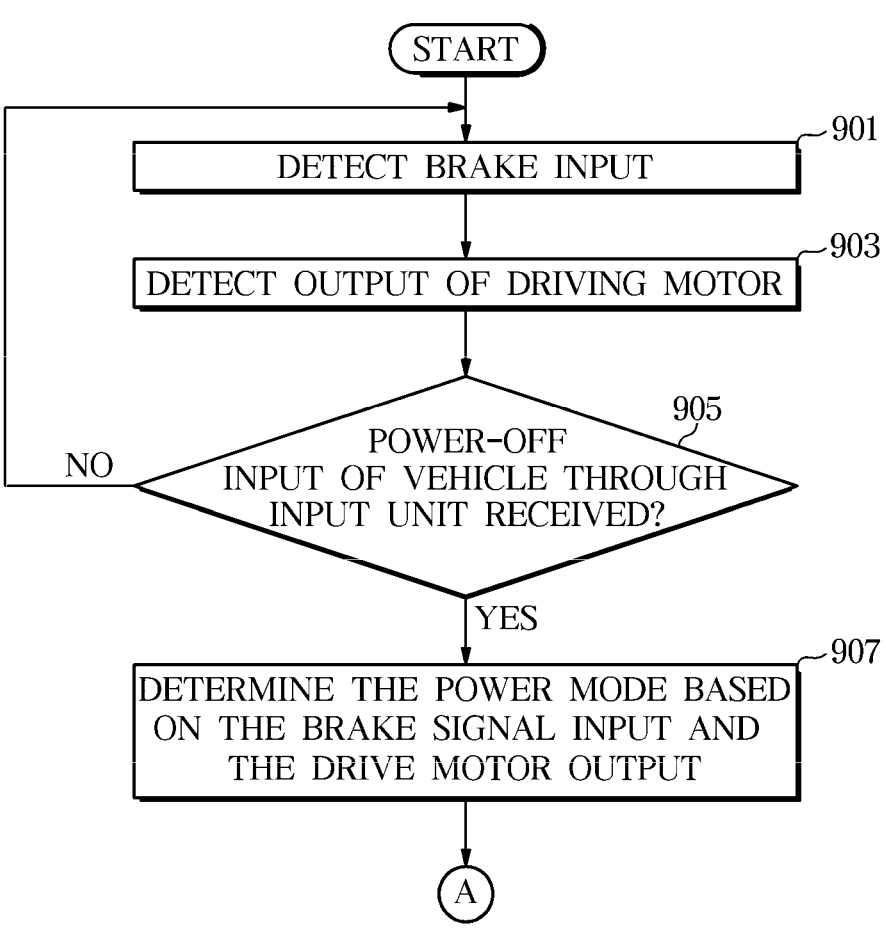
FIG. 9 is a flowchart of a control method of the vehicle according to an exemplary embodiment of the present disclosure.
Figure 10:
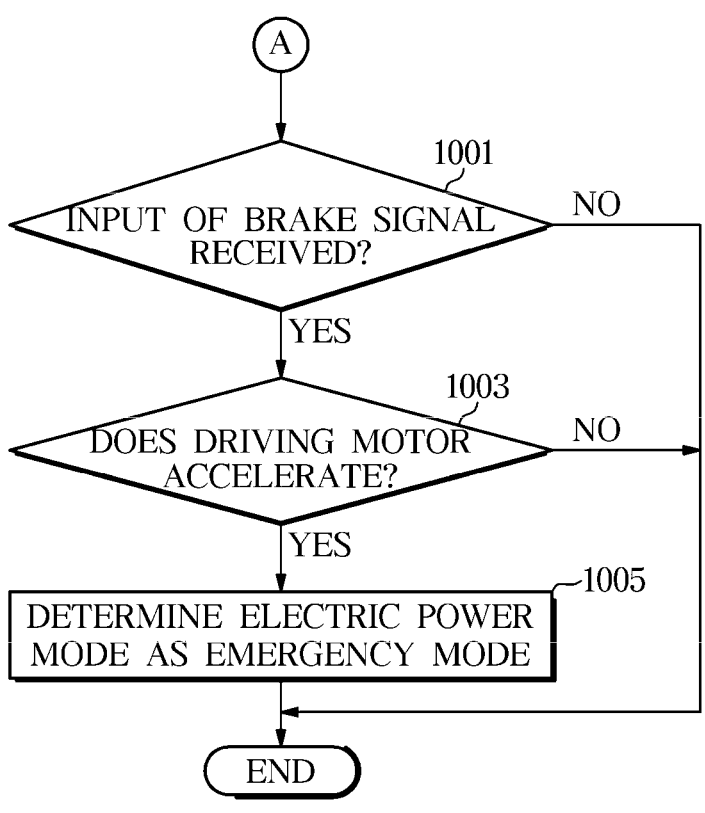
FIG. 10 is a flowchart of the control method of the vehicle according to an exemplary embodiment of the present disclosure.

FIG. 9 and FIG. 10 are flowcharts of a control method of the vehicle according to an exemplary embodiment of the present disclosure.

While the vehicle 1 is driving, a brake input may be detected (901), and an output of the driving motor 120 may be detected (903).

When an input related to power off of the vehicle 1 is received through the input unit 20 while the vehicle 1 is driving (YES in 905), the main controller 10 may be configured to determine the electric power mode based on the detection result (907).

That is, the main controller 10 may be configured to determine the electric power mode based on the detected input of the brake signal and the detected output of the driving motor 120 (907).

Conversely, when the input related to power off is not received (NO in 905), the main controller 10 may not determine whether or not the emergency mode is present, and accordingly, may not determine the electric power mode as the emergency mode.

In a case in which the input related to power off of the vehicle 1 is received while the vehicle 1 is driving, when it is determined that there is no output of the driving motor 120 (NO in 1003) in a situation in which the brake signal is input (YES in 1001), that is, when the driving motor 120 does not accelerate, the main controller 10 may be configured to determine that the electric power mode is not the emergency mode.

Furthermore, when the brake signal is not input (NO in 1001), the main controller 10 may be configured to determine that the electric power mode is not the emergency mode.

In the case in which the input related to power off of the vehicle 1 is received while the vehicle 1 is driving, when it is determined that there is the output of the driving motor 120 in the situation in which the brake signal is input (YES in 1001), that is, when the driving motor 120 accelerates (YES in 1003), the main controller 10 may be configured to determine that the electric power mode is the emergency mode (1005).

When it is determined as the emergency mode, the main controller 10 may reduce the risk of an accident by performing control such as rebooting or turning off the driving controller 40 as described above.

As is apparent from the above, according to a vehicle and a control method thereof according to an exemplary embodiment of the present disclosure, when an emergency situation occurs while driving and control is not performed smoothly, the risk of an accident may be reduced by rebooting a controller that is configured to control a driving motor to escape from the emergency situation or by turning off the controller to prevent acceleration of the vehicle.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a first battery;
   a second battery;
   an input unit;
   a first sensor provided to detect an input of a brake signal;
   a second sensor provided to detect an output of a driving motor;
   a driving controller provided to control the driving motor; and
   a main controller electrically connected to the input unit, the first sensor, the second sensor and the driving controller and configured to determine an electric power mode based on the input of the brake signal detected by the first sensor and the output of the driving motor detected by the second sensor when an input related to power off of the vehicle is received through the input unit while the vehicle is driving,
   wherein based on that an input related to power off of the vehicle is received while the vehicle is driving, the main controller is further configured to determine the electric power mode as an emergency mode when the main controller concludes that the driving motor is accelerating while the input of the brake signal is being received, and wherein the main controller is further configured to turn off a switch connected to the first battery and to reboot the driving controller when the main controller determines the electric power mode as the emergency mode, and operate the driving controller using the second battery; and turn on the switch connected to the first battery when the emergency mode is released.

2. The vehicle of claim 1, wherein the main controller is further configured to determine whether the emergency mode is released based on the input of the brake signal and the output of the driving motor after the driving controller is rebooted.

3. The vehicle of claim 2, wherein the main controller is further configured to repeat the reboot of the driving controller when the main controller concludes that the emergency mode is not released.

4. The vehicle of claim 1, further including:

a converter provided to convert electric power charged in the first battery into electric power of a different magnitude;

wherein the second battery is configured to be connected to the converter to perform charging using the electric power transferred from the converter, and wherein the main controller is further configured to determine a state of charging (SOC) value of the second battery and to charge the second battery through the converter in response that the SOC value of the second battery is less than a predetermined charging amount.

5. The vehicle of claim 1, wherein the main controller is further configured to generate a control signal for providing a notification to perform emergency power input when the main controller determines the electric power mode as the emergency mode.

6. The vehicle of claim 5, further including:

a display; and a speaker, wherein the main controller is further configured to provide the notification visually through the display or to provide the notification aurally through the speaker.

7. The vehicle of claim 5, wherein the main controller is further configured to turn off the driving controller when emergency power is input.

8. The vehicle of claim 7, wherein the main controller is further configured to generate a control signal for providing a turn-off notification of the driving controller.

9. A method of controlling a vehicle, the method comprising:

determining, by a main controller, an input of a brake signal;

determining, by the main controller, an output of a driving motor; and determining, by the main controller, an electric power mode based on the determined input of the brake signal and the determined output of the driving motor when an input related to power off of the vehicle is received by the main controller, through an input unit while the vehicle is driving, wherein based on that an input related to power off of the vehicle is received while the vehicle is driving, the determining of the electric power mode includes determining the electric power mode as an emergency mode when the main controller concludes that the driving motor is accelerating while the input of the brake signal is being received, when determining the emergency mode, turning off a switch connected to the first battery and rebooting a driving controller configured for controlling the driving motor, and operating the driving controller using a second battery; and turning on the switch connected to the first battery based on that the emergency mode is released.

10. The method of claim 9, further including:

determining, by the main controller, whether the emergency mode is released based on the input of the brake signal and the output of the driving motor after the driving controller is rebooted.

11. The method of claim 10, further including:

repeating, by the main controller, the reboot of the driving controller when the main controller concludes that the emergency mode is not released.

12. The method of claim 9, further including:

determining, by the main controller, a state of charging (SOC) value of the second battery; and charging, by the main controller, the second battery using electric power transferred from a converter converting electric power charged in the first battery into electric power of a different magnitude in response that the SOC value of the second battery is less than a predetermined charging amount.

13. The method of claim 9, further including:

generating, by the main controller, a control signal for providing a notification to perform emergency power input when the main controller determines the electric power mode as the emergency mode.

14. The method of claim 13, wherein the providing of the notification includes providing the notification visually through a display or providing the notification aurally through a speaker.

15. The method of claim 13, further including:

turning off, by the main controller, a driving controller configured for controlling the driving motor when emergency power is input.

16. The method of claim 15, further including: generating, by the main controller, a control signal for providing a turn-off notification of the driving controller.

* * * * *